US011161048B2

United States Patent
Lin (10) Patent No.: US 11,161,048 B2
(45) Date of Patent: Nov. 2, 2021

(54) INTERACTIVE TABLE COVERING DEVICE AND ELECTRONIC INTERACTIVE TABLE SYSTEM

(71) Applicant: Tzu-Chiao Lin, Taipei (TW)

(72) Inventor: Tzu-Chiao Lin, Taipei (TW)

( * ) Notice: Subject to any disclaimer, the term of this patent is extended or adjusted under 35 U.S.C. 154(b) by 97 days.

(21) Appl. No.: 16/659,600

(22) Filed: Oct. 22, 2019

(65) Prior Publication Data

US 2020/0122044 A1 Apr. 23, 2020

(30) Foreign Application Priority Data

Oct. 23, 2018 (CN) .......................... 201811233682.5

(51) Int. Cl.
| | |
|---|---|
| *A63F 13/90* | (2014.01) |
| *H04N 5/225* | (2006.01) |
| *G06K 9/00* | (2006.01) |
| *G06F 3/041* | (2006.01) |
| *G06F 3/16* | (2006.01) |
| *G06F 3/02* | (2006.01) |
| *A63F 13/2145* | (2014.01) |
| *G06F 3/14* | (2006.01) |

(52) U.S. Cl.
CPC .......... *A63F 13/90* (2014.09); *A63F 13/2145* (2014.09); *G06F 3/02* (2013.01); *G06F 3/041* (2013.01); *G06F 3/14* (2013.01); *G06F 3/16* (2013.01); *G06K 9/00288* (2013.01); *H04N 5/2257* (2013.01); *A63F 2300/1075* (2013.01); *G06F 2203/04104* (2013.01)

(58) Field of Classification Search
CPC .............. A63F 13/90; A63F 13/2145; A63F 2300/1075; G06G 3/02; G06G 3/041; G06G 3/14; G06G 3/16; G06K 9/00288; H04N 5/2257; G06F 2203/04104
See application file for complete search history.

(56) References Cited

U.S. PATENT DOCUMENTS

| | | | | |
|---|---|---|---|---|
| 2005/0215326 A1* | 9/2005 | Iosilevsky | ............... | G07F 17/32 463/46 |
| 2009/0131134 A1* | 5/2009 | Baerlocher | ........... | G07F 17/322 463/13 |

* cited by examiner

*Primary Examiner* — Werner G Garner
(74) *Attorney, Agent, or Firm* — Schmeiser, Olsen & Watts, LLP (57) ABSTRACT

Interactive table covering device for communicating with an electronic interactive table includes a cover body, image capturing unit, storage unit, communication unit, and processing unit. The covering includes at least one covering surface and a shaded space which is defined by the at least one covering surface and opens to outside. The image capturing unit is disposed on the cover body. The processing unit, storage unit, and communication unit are disposed in the cover body, and the processing unit is utilized to control the image capturing unit, storage unit, and communication unit. When being placed on a touch display area of the electronic interactive table, the interactive table covering device corresponds to a sub-area of the touch display area as a shaded area and controls the electronic interactive table to display a user interface image associated with a user in the shaded area through the communication unit.

20 Claims, 10 Drawing Sheets

INTERACTIVE TABLE COVERING DEVICE AND ELECTRONIC INTERACTIVE TABLE SYSTEM

CROSS-REFERENCE TO RELATED APPLICATION

This non-provisional application claims priority under 35 U.S.C. § 119(a) on Patent Application No(s). 201811233682.5 filed in People's Republic of China (PRC) on Oct. 23, 2018, the entire contents of which are hereby incorporated by reference.

BACKGROUND OF THE INVENTION

1. Field of the Invention

The present disclosure relates to technology of electronic interactive tables, and in particular to an interactive table covering device and an electronic interactive table system.

2. Description of the Related Art

Electronic interactive tables are electronic products that utilize multi-touch technology in conjunction with computers and constructed in the form of tables. The electronic interactive table offers an interactive user experience that is superior to the average computer and specifically allows multiple users to simultaneously perform multi-touch operations on a single plane, as well as human-computer interaction or interaction between users through the embedded computer therein. Currently, there are many relevant applications in business, entertainment, and education.

In the existing practice, since the image displayed in the electronic interactive table is on the display area of the desktop, the user's inconvenience may be caused for some applications requiring privacy. For example, when a card game such as a bridge is played, when two or four users play on the electronic interactive table, each user's card is displayed on the display area. Therefore, in order to prevent the opponent from seeing his/her own card, the user must Use your hand to cover the cards on the display area. As a result, the operation is inconvenient and hindered. These inconveniences increase the burden on the user's use and also make the user unable to obtain a convenient and smooth experience.

Thus, it is desirable to improve the human-computer interaction technology implemented on the electronic interactive table so as to facilitate user operation efficiency and reduce the burden on user operations.

BRIEF SUMMARY OF THE INVENTION

An objective of the present disclosure is to provide embodiments of an interactive table covering device and an electronic interactive table system. The usage of the interactive table covering device can facilitate user operation efficiency and reduce the burden on user operations, so as to make the user obtain a convenient and smooth experience.

To achieve at least the above objective, the present disclosure provides an embodiment of the interactive table covering device for communicating with an electronic interactive table, wherein the interactive table covering device comprises a cover body, an image capturing unit, a storage unit, a communication unit, and a processing unit. The cover body has at least one covering surface and a shaded space defined by the at least one covering surface, wherein the shaded space opens to outside. The image capturing unit is disposed on the cover body. The storage unit is disposed inside the cover body. The communication unit, disposed inside the cover body, is utilized for communicating with the electronic interactive table. The processing unit is disposed inside the cover body and electrically coupled to the image capturing unit, the storage unit, and the communication unit, and is utilized for controlling the image capturing unit, the storage unit, and the communication unit. When the interactive table covering device is placed on a touch display area of the electronic interactive table, the shaded space opens to the touch display area and outside, and the interactive table covering device corresponds to a sub-area of the touch display area as a shaded area, the interactive table covering device is utilized for controlling, through the communication unit, the electronic interactive table to display a user interface image associated with a user in the shaded area.

In an embodiment, the at least one covering surface includes a first covering surface, a second covering surface, and a third covering surface, wherein the second covering surface and the third covering surface are smaller than the first covering surface and respectively bend at two transversal sides of the first covering surface and extend, the first covering surface is a covering surface curved from bottom to top, the shaded space is partially surrounded by the first covering surface, the second covering surface, and the third covering surface.

In an embodiment, the image capturing unit obtains the user's facial image data, the processing unit is utilized to perform user recognition based on the facial image data so as to generate identification data, the communication unit is utilized to transmit the identification data to the electronic interactive table, so as to enable the electronic interactive table to display the user interface image associated with the user in the shaded area, based on the identification data.

In an embodiment, the image capturing unit obtains the user's facial image data, the processing unit controls the communication unit to transmit the facial image data to the electronic interactive table, so as to enable the electronic interactive table to display the user interface image associated with the user in the shaded area, based on the facial image data.

In an embodiment, the interactive table covering device further includes at least one touch end disposed on a bottom surface, when the interactive table covering device is placed on the touch display area, the at least one touch end is utilized for making at least one touch in the touch display area, so as to enable the electronic interactive table accordingly to locate the interactive table covering device in the touch display area and thus determine contents to be displayed by the touch display area in the shaded area.

In an embodiment, the interactive table covering device further includes a display unit, disposed in the shaded space and electrically coupled to the processing unit, wherein the processing unit receives user interface image data transmitted from the electronic interactive table through the communication unit, and accordingly controls the display unit to display the user interface image, so as to interact with the electronic interactive table.

In an embodiment, the display unit is a touch screen, for receiving touch input and accordingly interacting with the electronic interactive table.

In an embodiment, the interactive table covering device further includes a display unit, disposed in the shaded space and electrically coupled to the processing unit, wherein when the interactive table covering device is removed from, or is off, the touch display area, the processing unit is utilized to control the display unit, and receives user interface image data transmitted from the electronic interactive table through the communication unit, and accordingly controls the display unit to display the user interface image associated with the user, so as to interact with the electronic interactive table.

In an embodiment, the display unit is a touch screen, for receiving touch input and accordingly interacting with the electronic interactive table.

In an embodiment, the interactive table covering device further includes a sound unit, electrically coupled to the processing unit, for sound producing and sound recording; when the interactive table covering device is removed from, or is off, the touch display area, the processing unit controls the sound unit, so as to interact with the electronic interactive table.

In an embodiment, when the interactive table covering device is removed from, or is off, the touch display area, the interactive table covering device is utilized to control the electronic interactive table to change the user interface image, previously displayed in the shaded area before the interactive table covering device is removed from, or is off, the touch display area, into another user interface image.

In an embodiment, the interactive table covering device is utilized to communicate with a terminal device by way of the communication unit and the electronic interactive table, wherein the image capturing unit obtains image data of user beside the electronic interactive table, the processing unit outputs and transmits live image data based on the obtained image data to the terminal device through the communication unit and the electronic interactive table so that the electronic interactive table is capable of remotely interacting with the terminal device.

In an embodiment, the user interface image includes an indication of a card for the user, a gaming token for the user, or a game instruction.

To achieve at least the above objective, the present disclosure provides embodiments of an electronic interactive table system comprising an electronic interactive table and an interactive table covering device, according to any one of the above embodiments or a combination thereof, wherein the electronic interactive table includes a touch screen and a computing device. The touch screen provides the touch display area. The computing device, electrically coupled to the touch screen, is utilized for communication and generating a user interface for interaction.

In an embodiment, the electronic interactive table further includes a housing case, an image capturing unit, and a sound unit. The housing case surrounds lateral sides of the touch screen such that the touch display area is capable of standing upward, wherein the computing device is disposed inside the housing case. The image capturing unit is disposed on the housing case. The sound unit is disposed on the housing case, wherein the image capturing unit and the sound unit are utilized for video interaction.

In an embodiment, the computing device is utilized to communicate with a terminal device, wherein the image capturing unit of the electronic interactive table obtains image data of user beside the electronic interactive table, the computing device outputs and transmits live image data based on the obtained image data to the terminal device so that the electronic interactive table is capable of remotely interacting with the terminal device.

In an embodiment, the electronic interactive table further includes a support frame, connected to the housing case, wherein when the support frame is in a first state, the support frame enables the electronic interactive table to stand on the ground and the touch display area to be directed upward for user interaction; when the support frame is in a second state, the support frame enables the electronic interactive table to stand on the ground and the touch display area to be directed horizontally for user interaction or image viewing.

In an embodiment, the computing device is further utilized to communicate with another electronic interactive table, and change the user interface image to be displayed by the touch display area, based on data for communication with the another electronic interactive table, so as to enable the electronic interactive table to interact with the another electronic interactive table.

As disclosed above, the various embodiments can be employed to implement the interactive table covering device and the electronic interactive table system having the interactive table covering device. The usage of the interactive table covering device can facilitate user operation efficiency and reduce the burden on user operations, so as to make the user obtain a convenient and smooth experience.

DETAILED DESCRIPTION OF THE INVENTION

To facilitate understanding of the object, characteristics and effects of this present disclosure, embodiments together with the attached drawings for the detailed description of the present disclosure are provided.

Figure 1:
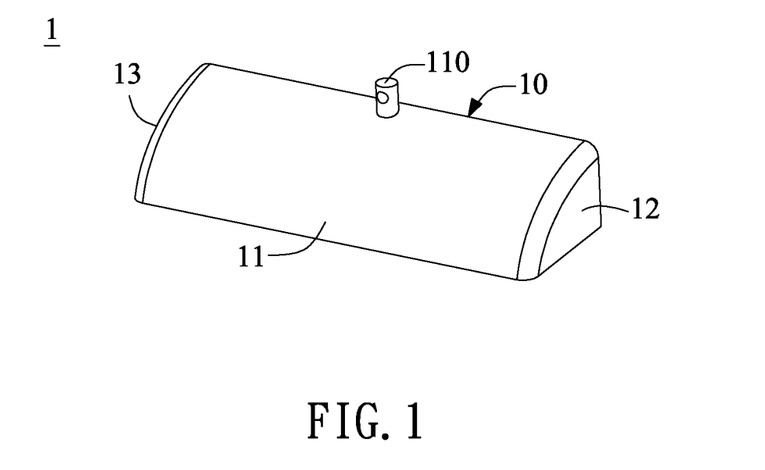
FIG. 1 is a schematic diagram illustrating an embodiment of an interactive table covering device.
Figure 2:
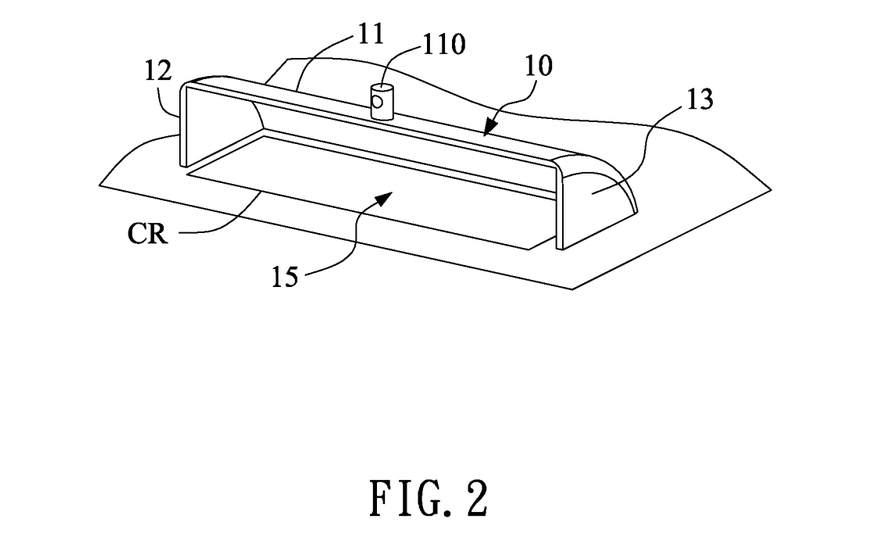
FIG. 2 is a schematic diagram illustrating an embodiment of the interactive table covering device viewed in another direction.
Figure 3:
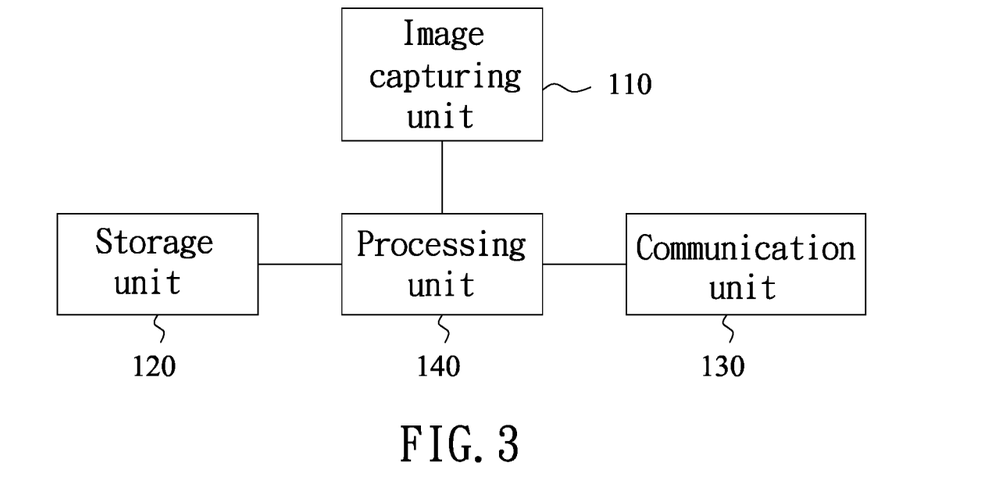
FIG. 3 is a circuit block diagram illustrating an embodiment of the interactive table covering device of FIG. 1.
Figure 4:
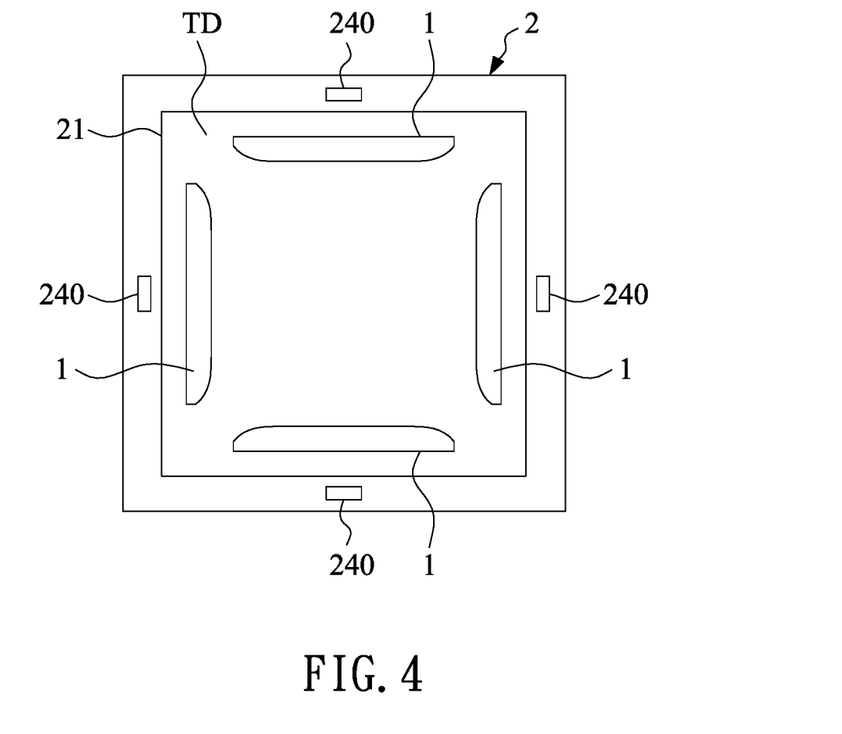
FIG. 4 is a top view of an embodiment of an electronic interactive table.

Referring to FIG. 1 to FIG. 3, FIG. 1 illustrates an embodiment of an interactive table covering device 1 in a schematic diagram; FIG. 2 illustrates an embodiment of the interactive table covering device 1 viewed in another direction; FIG. 3 illustrates an embodiment of the interactive table covering device 1 of FIG. 1 in a circuit block diagram form. As shown in FIG. 4, the interactive table covering device 1 is utilized for communicating with an electronic interactive table 2 having a touch display area TD, which can facilitate various user interactive applications. As illustrated in FIG. 1 to FIG. 3, the interactive table covering device 1 includes a cover body 10, an image capturing unit 110, a storage unit 120, a communication unit 130, and a processing unit 140.

For example, as shown in FIG. 1, the cover body 10 includes a first covering surface 11, a second covering surface 12, and a third covering surface 13, wherein the area of, or the extent covered by, the second covering surface 12 and the third covering surface 13 is smaller than that of the first covering surface 11. The second covering surface 12 and the third covering surface 13 respectively bend at two transversal sides (e.g., left and right sides) of the first covering surface 11 and extend. The first covering surface 11 is a covering surface curved from bottom to top. As shown in FIG. 2, the cover body 10 further has a shaded space 15, the shaded space 15 is partially surrounded by the first covering surface 11, the second covering surface 12, and the third covering surface 13 and opens to outside. In other words, the shaded space 15, which opens to outside, can be defined by the first covering surface 11, the second covering surface 12, and the third covering surface 13. However, the implementation of the invention is not limited to the above examples. As an example, for the cover body, the first covering surface 11 may be a flat surface, a wave surface, a concave or convex surface or any curved surface. For example, the cover body may be implemented as having at least one covering surface and a shaded space which is defined by the at least one covering surface and opens to outside; such a cover body may be served as an embodiment of the invention. For example, the covering surface of the cover body may have one curved surface only. For example, the cover body may be implemented by substituting the covering surfaces of FIG. 1 by a portion of a sphere (e.g., a truncated sphere). The cover body may include three or more covering surfaces, such as a truncated polygonal cylinder.

The image capturing unit 110 is disposed on the cover body 10. The image capturing unit 110 may be implemented by a camera unit, such as a module including at least one or two camera lens or a module including a camera lens which can be rotatable or whose direction of photo taking is adjustable. The storage unit 120 is disposed in the cover body 10. The storage unit 120 may be a storage device, such as a random access memory, read-only memory, or flash memory, or other storage medium, such as hard disk and so on, for instance. The communication unit 130 may be a communication device, such as a wired communication device (e.g., a local area network device) or a wireless communication device (e.g., a Wi-Fi, Bluetooth®, or other). The communication unit 130, disposed in the cover body 10, is employed to communicate with the electronic interactive table 2. The processing unit 140 is disposed in the cover body 10 and is electrically coupled to the image capturing unit 110, the storage unit 120, and the communication unit 130. The processing unit 140 is utilized for controlling the image capturing unit 110, the storage unit 120, and the communication unit 130. The processing unit 140 may be a microprocessor, a single chip, or other processor, for instance.

In addition, the interactive table covering device 1 may include other component (s), such as a sound unit, which includes a microphone, a speaker, or earphone jack, or other related circuit, for interaction. The interactive table covering device 1 may further include a power source, such as a rechargeable battery and other circuit; or a receiving side circuit for wireless charging, where in this instance, the electronic interactive table 2 may be implemented to include a powering side circuit for wireless charging. However, the implementation of the invention is not limited to the above examples.

As shown in FIG. 2 or FIG. 4, when the interactive table covering device 1 is placed on the touch display area TD of the electronic interactive table 2, the shaded space 15 of the cover body 10 opens to the touch display area TD and outside, and the interactive table covering device 1 corresponds to a sub-area of the touch display area TD, referred to as a shaded area CR. If a user is in a position facing the cover body 10 in the direction as illustrated in FIG. 2, the user is able to look at the shaded area CR through the shaded space 15 while the adjacent user (s) will be unable to see this shaded area CR due to the covering surfaces. The interactive table covering device 1 is utilized to control the electronic interactive table 2 to display a user interface image associated with the user in the shaded area CR, through the communication unit 130.

For example, if the electronic interactive table 2 is employed to implement some applications that require privacy (such as card games such as bridges), the electronic interactive table 2 can make the user interface image (e.g., the card(s) for each user) associated with each user be displayed on an area of the touch display area TD corresponding to the shaded space 15 of the interactive table covering device 1 associated with each user, so as to prevent one's user interface image from being seen by the other. Other applications, for example, applications for business, entertainment, and education, such as educational board games or other games, can be implemented in a similar manner. However, the implementation of the invention is not limited to the above examples.

Hence, the electronic interactive table 2 is able to facilitate user operation efficiency and reduce the burden on user operations by way of the communication between the interactive table covering device 1 and the electronic interactive table 2 so as to make the user obtain a convenient and smooth experience.

Figure 5:
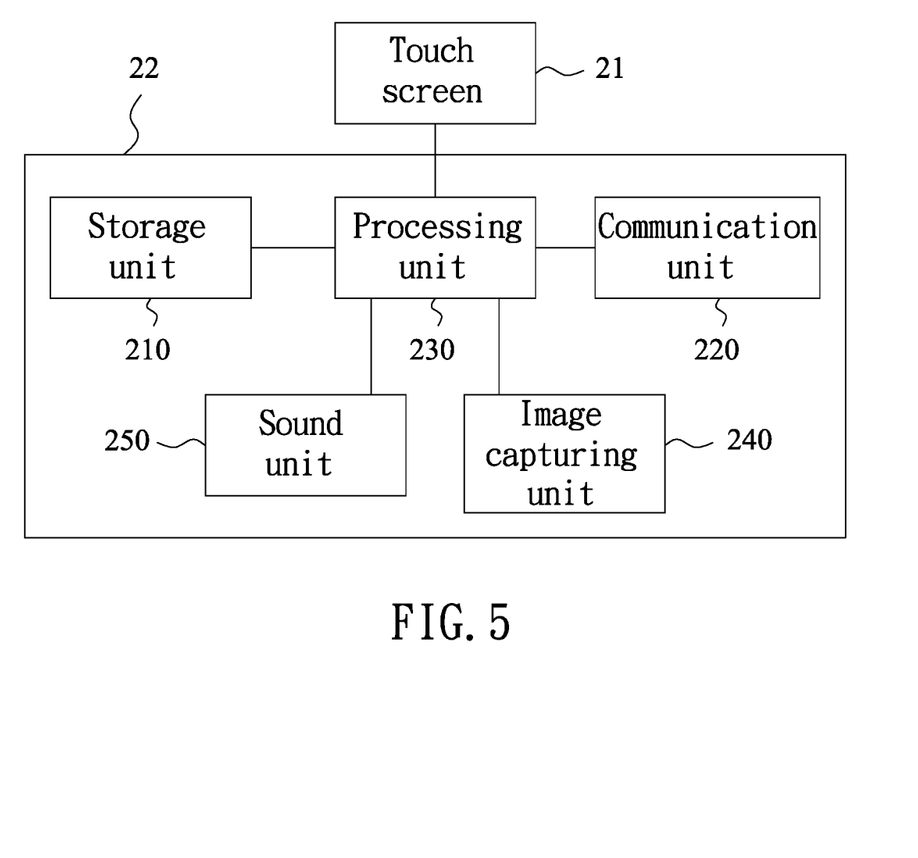
FIG. 5 is a circuit block diagram illustrating an embodiment of the electronic interactive table of FIG. 4.

Referring to FIG. 4 and FIG. 5, FIG. 4 is a top view of an embodiment of the electronic interactive table 2; FIG. 5 is a circuit block diagram illustrating an embodiment of the electronic interactive table of FIG. 4. As shown in FIG. 4 and FIG. 5, the electronic interactive table 2 includes a touch screen 21 and a computing device 22. The touch screen 21 is utilized to provide the touch display area TD for displaying a user interface. The computing device 22 is electrically coupled to the touch screen 21 and is utilized for communication and for generating the user interface for interaction.

In an embodiment, the computing device 22 includes a storage unit 210, a communication unit 220, and a processing unit 230. The communication unit 220 is employed to communicate with the interactive table covering device 1. The processing unit 230, electrically coupled to the storage unit 210, the communication unit 220, and the touch screen 21, is utilized for generating a user interface for interaction.

In an embodiment, the electronic interactive table 2 further includes a housing case 20, an image capturing unit 240, and a sound unit 250. The housing case 20 surrounds the lateral sides of the touch screen 21 so that the touch display area TD is capable of standing upward, the computing device 22 is disposed in the housing case 20. One or more image capturing units 240 may be included and disposed on the housing case 20, for example, on or beside the lateral sides of the touch screen 21. The sound unit 250 is disposed on the housing case 20, wherein the image capturing unit 240 and the sound unit 250 are employed for video interaction. The sound unit 250, for example, includes a microphone, a speaker, or earphone jack, or other related circuit.

In some embodiments, embodiments of an electronic interactive table system, which may include the interactive table covering device 1 and the electronic interactive table 2.

The following will further illustrate various implementations of the interactive table covering device 1 and the electronic interactive table 2.

In some embodiments, the image capturing unit 110 of the interactive table covering device 1 obtains the user's facial image data, the processing unit 140 is utilized to perform user recognition based on the facial image data so as to generate identification data, the communication unit 130 is utilized to transmit the identification data to the electronic interactive table 2, so as to enable the electronic interactive table 2 to display the user interface image associated with the user in the shaded area CR, based on the identification data.

For example, taking the case of FIG. 2, if a user is in a position facing interactive table covering device 1 in the direction as illustrated in FIG. 2, the image capturing unit 110 can obtain the user's facial image data. The processing unit 140 performs user recognition based on the facial image data to generate identification data. For example, an exclusive user A's image (or feature values of such image) and account may be stored in the interactive table covering device 1 (or in an external device). The processing unit 140 of the interactive table covering device 1 performs the processing of user recognition, based on the image (or feature values of such image) of the exclusive user (e.g., user A) and the obtained facial image data. If the facial image data corresponds to the image (or feature values of such image) of the exclusive user, the processing unit 140 can generate identification data to indicate that the user in front of the shaded space 15 of the interactive table covering device 1 is an exclusive user. The communication unit 130 transmits the identification data to the electronic interactive table 2, in order to enable the electronic interactive table 2 to display the user interface image associated with the user of the interactive table covering device 1 in the shaded area CR, based on the identification data. The user interface image may include an indication of a card for the user, a gaming token for the user, or a game instruction, or a combination thereof, for example. However, the implementation of the invention is not limited to the above examples. If the facial image data does not correspond to the image (or feature values of such image) of the exclusive user, the processing unit 140 can generate identification data to indicate that the user in front of the shaded space 15 of the interactive table covering device 1 is not an exclusive user. In this situation, the communication unit 130 transmits the identification data to the electronic interactive table 2, so that the electronic interactive table 2 no longer displays the user interface image for the exclusive user associated with the interactive table covering device 1 or changes the user interface image for the exclusive user into other image, such as an image showing the cards being covered or other image (e.g., an image for warning), thus protecting the privacy of the exclusive user with respect to the user interface image.

In some embodiments, the image capturing unit 110 of the interactive table covering device 1 obtains the user's facial image data, the processing unit 140 controls the communication unit 130 to transmit the facial image data to the electronic interactive table 2, so as to enable the electronic interactive table 2 to display the user interface image in the shaded area CR associated with the user, based on the facial image data. For example, an exclusive user A's image (or feature values of such image) and account associated with the interactive table covering device 1 may be stored in the electronic interactive table 2 (or the interactive table covering device 1 or an external device), the computing device 22 of the electronic interactive table 2 performs the processing of user recognition, based on the image (or feature values of such image) of the exclusive user (e.g., user A) and the obtained facial image data. If the facial image data corresponds to the image (or feature values of such image) of the exclusive user, the computing device 22 controls the touch screen 21 to display the user interface image for the exclusive user associated with the interactive table covering device 1 in the shaded area CR. However, the implementation of the invention is not limited to the above examples. If the facial image data does not correspond to the image (or feature values of such image) of the exclusive user, the computing device 22 can control the touch screen 21 not to display the user interface image for the exclusive user associated with the interactive table covering device 1, or to change the user interface image for the exclusive user into other image, such as the image showing the cards being covered or other image (e.g., an image for warning), thus protecting the privacy of the exclusive user with respect to the user interface image.

In some embodiments, the interactive table covering device may further include at least one touch end disposed on a bottom surface thereof. When the interactive table covering device is placed on the touch display area TD of the electronic interactive table 2, the at least one touch end is utilized to make at least one touch in the touch display area TD so that the electronic interactive table 2 can determine a corresponding location of the interactive table covering device in the touch display area TD and accordingly determine contents to be displayed by the touch display area within the shaded area CR. In this manner, the electronic interactive table 2 can change the user interface image displayed by the touch display area TD, based on the corresponding location.

Figure 6:
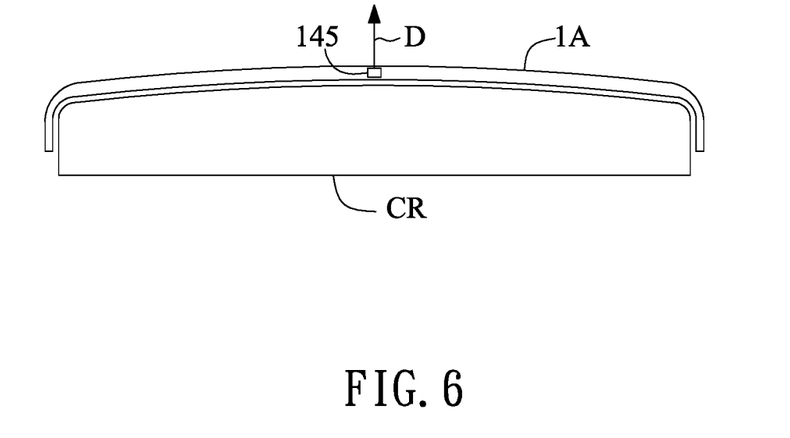
FIG. 6 is a schematic diagram illustrating another embodiment based on the interactive table covering device of FIG. 1.
Figure 7:
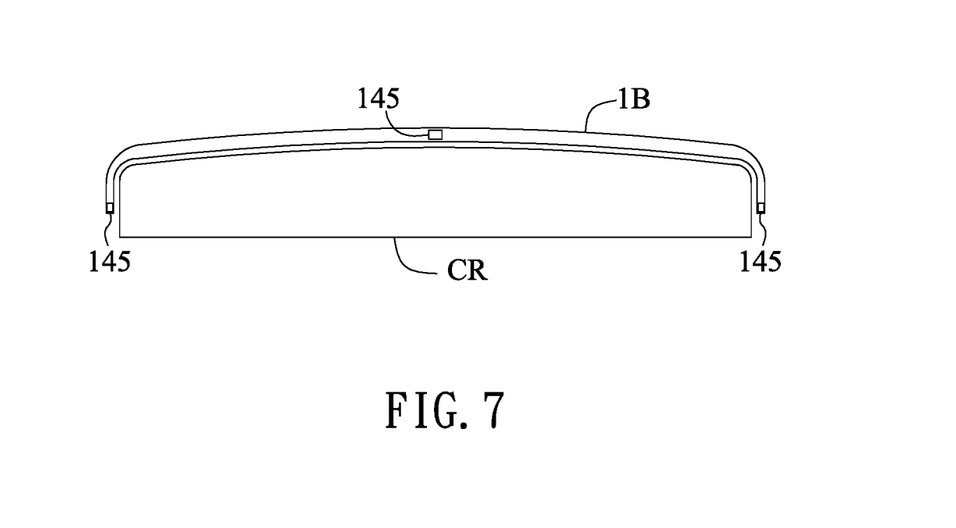
FIG. 7 is a schematic diagram illustrating yet another embodiment based on the interactive table covering device of FIG. 1.

Referring to FIG. 6 and FIG. 7, embodiments based on the interactive table covering device of FIG. 1 are illustrated. As shown in FIG. 6, the interactive table covering device 1A is an embodiment based on the interactive table covering device 1 of FIG. 1 and includes at least one touch end 145 disposed on a bottom surface thereof so that the touch end 145 can generate a touch in the touch display area TD, wherein the touch end 145 may be anything that can generate a touch, such as a capacitor or an end with a metal or conductive material, such as a metal-containing cured silicone material and so on. For example, the electronic interactive table 2 can determine, perhaps coarsely, the position of the interactive table covering device 1A, based on a touch signal caused by the touch generated by the touch end 145 in the touch display area TD, and further determine the position or region where the interactive table covering device 1A locates, by application of the image(s) from the image capturing unit 110 of the interactive table covering device 1A. For example, the above-mentioned embodiment regarding user facial recognition is applied; after the user recognition is passed and it is determined that the user facing the cover body 10 in the direction as illustrated in FIG. 2 is an exclusive user associated with the interactive table covering device 1A, the direction D, as indicated in FIG. 6, that the first covering surface 11 (or the shaded space 15) of the interactive table covering device 1A is directed to can be determined by using image recognition and accordingly the position or region where the interactive table covering device 1A locates can be determined. For example, the electronic interactive table 2 can be configured to store data corresponding to a preset corresponding region occupied by an interactive table covering device 1A in terms of pixels of length and width (e.g., 700×100) or ratio thereof (e.g., 7:1). When the location of touch by the touch end 145 and the direction D that the first covering surface 11 is directed to are obtained, the electronic interactive table 2 can determine contents to be displayed by the touch display area in the shaded area CR, based on the corresponding location of the interactive table covering device 1A, or may further change other user interface image(s) to be displayed by the touch display area TD. However, the implementation of the invention is not limited to the above examples.

In another embodiment, as shown in FIG. 7, the interactive table covering device 1B is an embodiment based on the interactive table covering device 1 of FIG. 1, at least three touch ends 145 are disposed on a bottom surface thereof. For example, the electronic interactive table 2 can utilize the touch ends 145 to estimate the coordinates of at least three touch locations for the interactive table covering device 1B so as to determine contents to be displayed by the touch display area in the shaded area CR, or may further change other user interface image(s) to be displayed by the touch display area TD.

Figure 8:
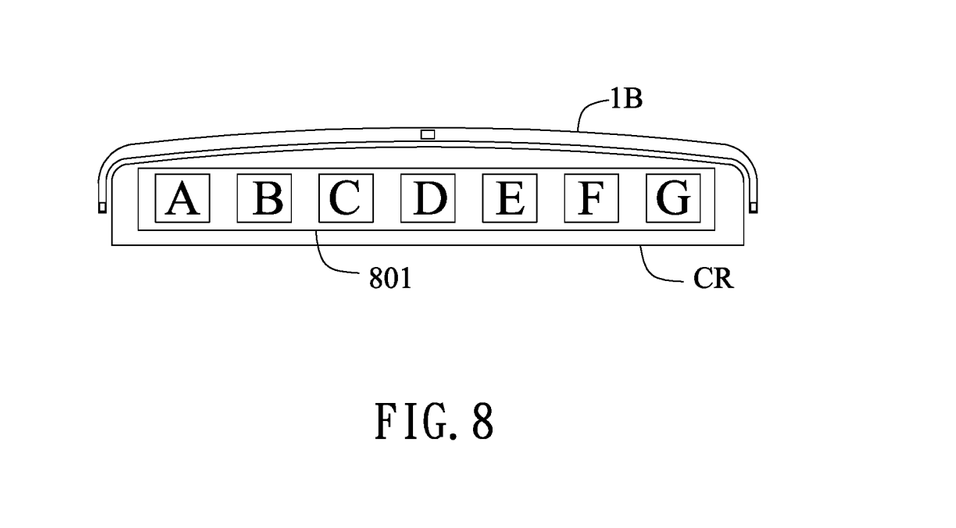
FIG. 8 is a schematic diagram illustrating when an interactive table covering device is placed on an electronic interactive table in a scenario.
Figure 9:
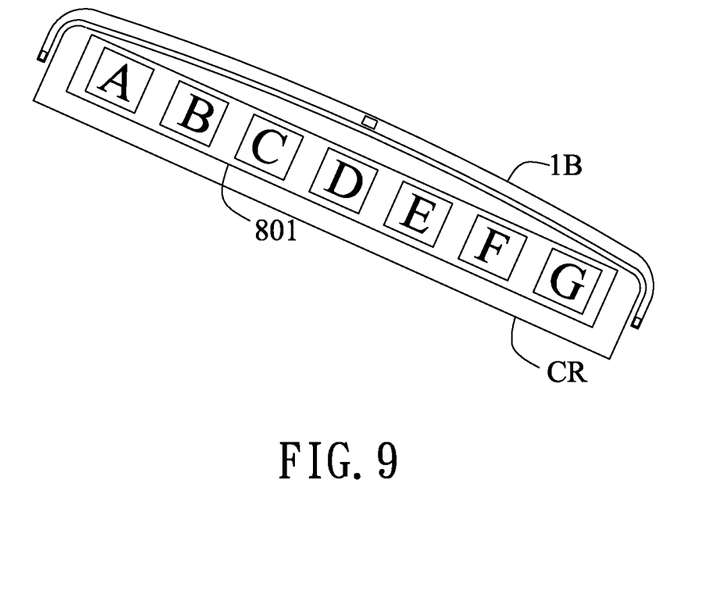
FIG. 9 is a schematic diagram illustrating when an interactive table covering device is placed on an electronic interactive table in another scenario.

In some embodiments, the electronic interactive table 2 determines a corresponding position of the interactive table covering device (1A or 1B) in the touch display area TD in response to the touch caused by the touch end, the computing device 22 of the electronic interactive table 2 changes the user interface image displayed in the touch display area TD based on the corresponding position. FIG. 8 illustrates a scenario when the interactive table covering device 1B is placed on the electronic interactive table 2. As shown in FIG. 8, the electronic interactive table 2 displays an user interface image 801 in the shaded area CR of the touch display area TD corresponding to the shaded space 15 of the interactive table covering device 1B in response to the corresponding position of the interactive table covering device 1B. If the user moves the interactive table covering device 1B to the top, bottom, left, right or any direction of the touch display area TD, the electronic interactive table 2 also displays the user interface image 801 in the appropriate position. For example, when interactive table covering device 1B is moved to the position as shown in FIG. 9, the shaded area CR changes its position correspondingly, the electronic interactive table 2 also makes the user interface image 801 to be displayed in the appropriate position, that is, in the shaded area CR corresponding to the current position of the interactive table covering device 1B.

Figure 10:
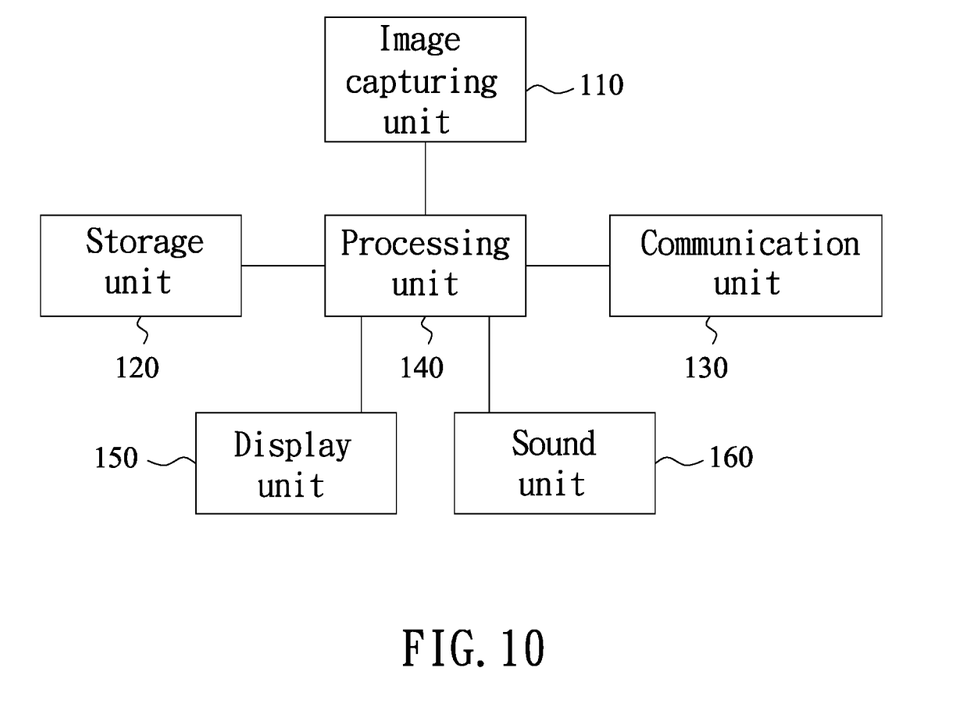
FIG. 10 is a circuit block diagram illustrating an embodiment based on the interactive table covering device of FIG. 1.
Figure 11:
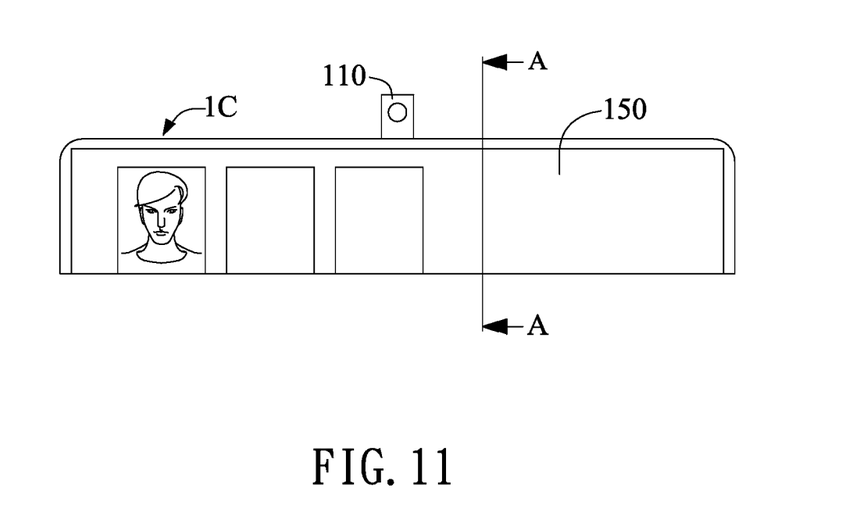
FIG. 11 is a schematic diagram illustrating an embodiment based on an interactive table covering device of FIG. 1.
Figure 12:
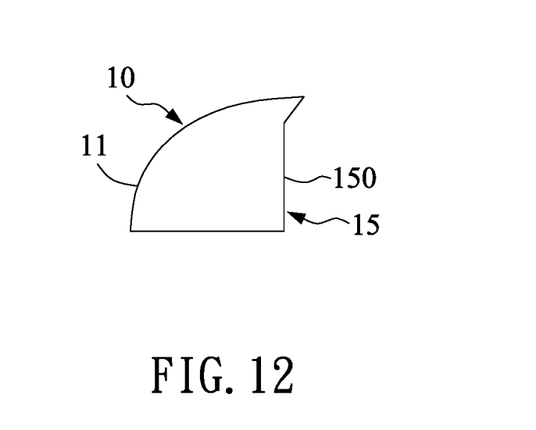
FIG. 12 is a cross-section view of the interactive table covering device taken along line AA of FIG. 11.

In some embodiments, an embodiment based on the interactive table covering device 1 may further include a display unit 150, for example, a liquid crystal display device or other display device, or touch screen. Referring to FIG. 10 to FIG. 12, FIG. 10 is a circuit block diagram illustrating an embodiment based on the interactive table covering device of FIG. 1; FIG. 11 is a schematic diagram illustrating an embodiment based on an interactive table covering device 1C of FIG. 1; FIG. 12 is a cross-section view of the interactive table covering device 1C taken along line AA of FIG. 11. As shown in FIG. 10 to FIG. 12, the display unit 150 can be disposed in the shaded space 15 facing away from the first covering surface 11 and is electrically coupled to the processing unit 140. In addition, the interactive table covering device 1C may include other component, for example, a sound unit 160. However, the implementation of the invention is not limited to the above examples.

The communication unit 130 is utilized for communicating with the electronic interactive table 2. The processing unit 140 receives user interface image data transmitted from the electronic interactive table 2 through the communication unit 130, and accordingly controls the display unit 150 to display the user interface image in order to interact with the electronic interactive table 2. For example, if the electronic interactive table 2 is employed to implement some applications that require privacy (such as card games such as bridges), the electronic interactive table 2 can transmit user interface data of the corresponding user interface image (e.g., cards of each user) of each user to the corresponding interactive table covering device 1C of each user. Each interactive table covering device 1C, by using the processing unit 140, controls the display unit 150 to display the corresponding user interface image (e.g., cards of each user) of each user, so as to prevent one's user interface image from being seen by the other. However, the implementation of the invention is not limited to the above examples. For example, the electronic interactive table 2 may transmit the corresponding user interface image (e.g., other auxiliary information other than cards of each user) of each user to the corresponding interactive table covering device 1C to display.

In some embodiments, the interactive table covering device 1C may be used after being removed from, or is off, the surface of the electronic interactive table 2. For example, when the interactive table covering device 1C is removed from, or is off, the touch display area TD, the processing unit 140 is employed to control the display unit 150, and receives user interface image data transmitted from the electronic interactive table 2 through the communication unit 130, and accordingly controls the display unit 150 to display the user interface image associated with the user, so as to interact with the electronic interactive table. For example, the interactive table covering device 1C may be implemented, according to the present embodiment, as: when the interactive table covering device 1C is used as being on the surface of the electronic interactive table 2, the display unit 150 display no image or displays images different from the contents in the shaded area CR; when the interactive table covering device 1C is removed from, or is off, the surface of the electronic interactive table 2, the processing unit 140 controls the display unit 150 to display the user interface image associated with the user.

In some embodiments, when the interactive table covering device 1C is removed from, or is off, the touch display area TD, the interactive table covering device 1C is employed to control the electronic interactive table 2 to change the user interface image, which is previously displayed in the shaded area CR before the interactive table covering device 1C is removed from, or is off, the touch display area TD, into another user interface image.

For example, when the interactive table covering device 1C is removed from, or is off, the touch display area TD, the computing device 22 of the electronic interactive table 2 changes the user interface image displayed by the touch display area TD according to the position where the interactive table covering device 1C is removed from, or is off, the touch display area TD, and transmits the user interface data corresponding to the interactive table covering device 1C to the interactive table covering device 1C, so that the user interface image associated with the interactive table covering device 1C changes from being displayed in the shaded area CR of the touch display area TD when the interactive table covering device 1C has not been removed from, or is off, the touch display area TD to being displayed by the display unit 150 after the interactive table covering device 1C is removed from, or is off, the touch display area TD. In other words, when the interactive table covering device 1C is removed from the touch display area TD, the position where the interactive table covering device 1C is removed from the touch display area TD and the removal serve as a way of controlling (or referred to as triggering) the electronic interactive table 2 to change the user interface image displayed by the touch display area TD. Taking FIG. 8 for example, it is supposed that the interactive table covering device 1B is replaced by the interactive table covering device 1C with the display unit 150; when a user holds the interactive table covering device 1C so that it is removed from the touch display area TD, the user interface image 801 or similar images changes to being displayed by the display unit 150 of the interactive table covering device 1C. Meanwhile, the electronic interactive table 2 may change the user interface image 801 displayed in the shaded area CR of the touch display area TD into another user interface image, for example, an image without the user interface image 801 (e.g., the cards of the user) previously displayed in the shaded area CR or other image (e.g., an image showing the cards being covered).

Hence, the electronic interactive table 2 is able to facilitate user operation efficiency and reduce the burden on user operations by way of the communication between the interactive table covering device 1C and the electronic interactive table 2 so as to make the user obtain a convenient and smooth experience.

In addition, in some embodiments, the display unit 150 of the interactive table covering device 1C, as shown in FIG. 11, may be a touch screen for provide various touch-screen functionality. For example, the user may perform touch operations, such as clicking, sliding or other, on a user interface displayed by the display unit 150. The interactive table covering device 1C receives the touch inputs caused by user's touch operations, generates instructions based on the touch inputs, and transmits the instructions to the electronic interactive table 2 so as to communicate and interact with the electronic interactive table 2. When the interactive table covering device 1C is removed from, or is off, the touch display area TD, the user can apply the above touch-screen functions to interaction with the electronic interactive table 2 for application related to business, entertainment, or education, for instance, while the interactive table covering device 1C communicates with the electronic interactive table 2. In addition, in some embodiments, the interactive table covering device 1C may also include a sound unit 160, which, for example, includes a microphone, a speaker, or earphone jack, or other related circuit, so that the interactive table covering device 1C can produce sound through the speaker or earphone jack, or record sound by the microphone. When the interactive table covering device is removed from, or is off, the touch display area, the processing unit further controls the sound unit, so as to interact with the electronic interactive table. Hence, although the user has been away from the electronic interactive table 2, the user is still capable of transmitting video and sound to the electronic interactive table 2 by using interactive table covering device 1C.

Figure 13:
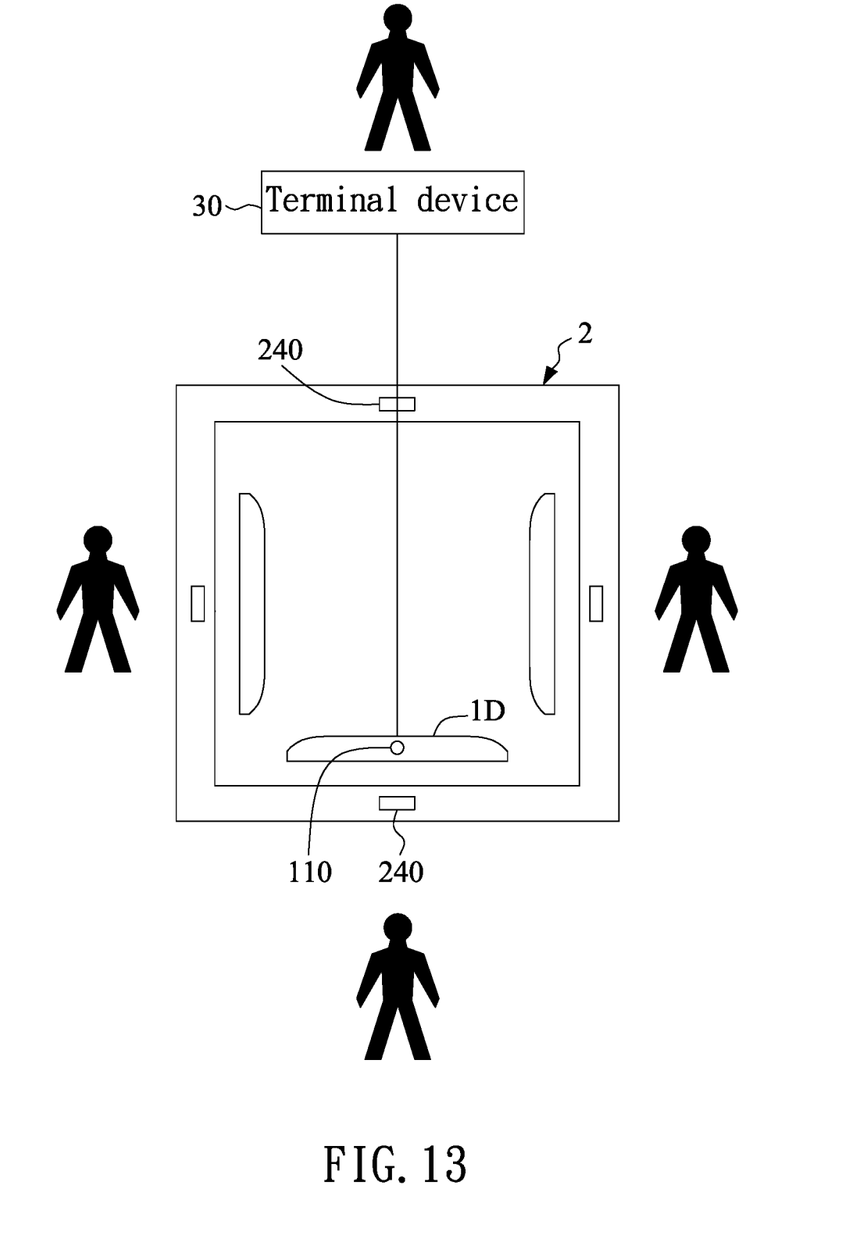
FIG. 13 is a schematic diagram illustrating an embodiment of communication between an interactive table covering device based on FIG. 1 and a terminal device.

In some embodiments, the interactive table covering device may communicate with a terminal device by way of the communication unit and the electronic interactive table. Referring to FIG. 13, an embodiment of communication between an interactive table covering device based on FIG. 1 and a terminal device is illustrated in a schematic diagram. As shown in FIG. 3 and FIG. 13, the image capturing unit 110 of the interactive table covering device 1D obtains image data of user beside the electronic interactive table 2, the processing unit 140 of the interactive table covering device 1D outputs and transmits live image data based on the obtained image data to the terminal device 30 through the communication unit 130 and the electronic interactive table 2, so that the electronic interactive table 2 is capable of remotely interacting with the terminal device 30.

In some embodiments, the computing device 22 of the electronic interactive table 2 may communicate with the terminal device 30, wherein the image capturing unit 240 of the electronic interactive table 2 can obtain image data of user beside the electronic interactive table 2, the computing device 22 outputs and transmits live image data based on the obtained image data to the terminal device 30, so that the electronic interactive table 2 is capable of remotely interacting with the terminal device 30.

As illustrated in the above embodiments, the users beside the electronic interactive table 2 or the remote user who is on-line are capable of interaction through the electronic interactive table 2, for application related to such as business, entertainment, or education, for instance. The remote user can join the interaction performed by the electronic interactive table 2 through the terminal device 30 to obtain good user experience of live interaction.

Figure 14:
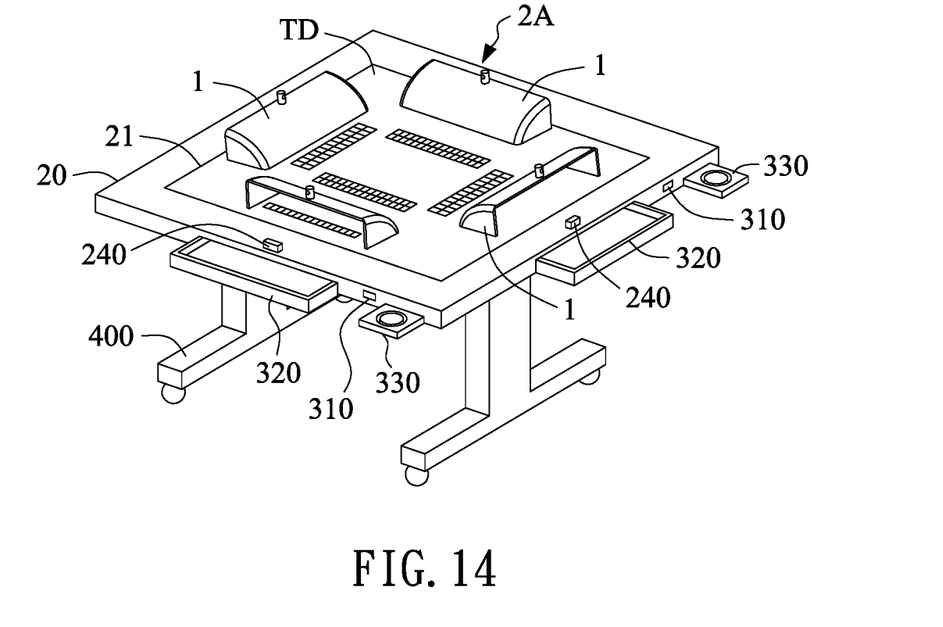
FIG. 14 is a schematic diagram illustrating another embodiment based on the electronic interactive table of FIG. 4.

Referring to FIG. 14, another embodiment based on the electronic interactive table of FIG. 4 is illustrated. As shown in FIG. 14, the electronic interactive table 2A is an embodiment of the electronic interactive table 2 and may further include connector interfaces 310, drawers 320, cup holders 330, a support frame 400. The connector interfaces 310, drawers 320, cup holders 330 are all disposed in the housing case 20. The support frame 400 is connected below the housing case 20. For example, the support frame 400 may be implemented to be detachably or fixedly disposed under the housing case 20. The connector interface 310 is, for example, a USB interface, and a user can connect a terminal device such as a mobile device or so on to the computing device 22 of the electronic interactive table 2A through the connector interface 310 to transmit data or perform charging, or obtain a data connection.

Figure 15:
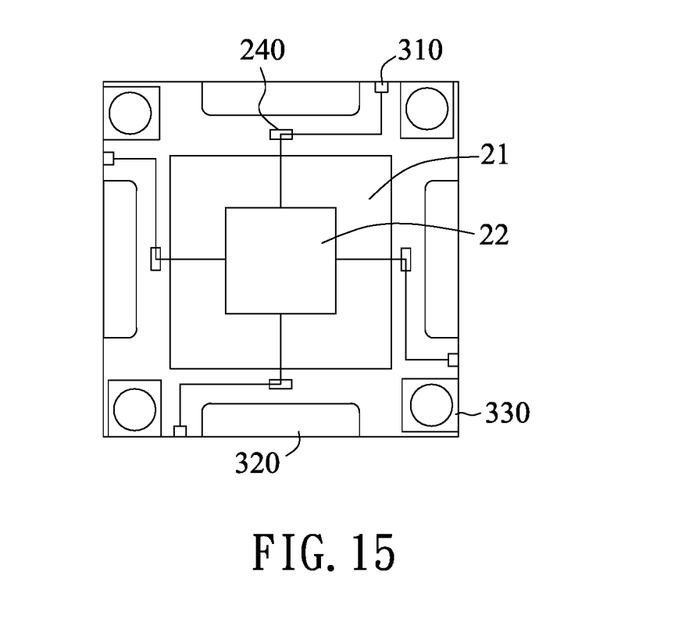
FIG. 15 is a schematic diagram of the electronic interactive table of FIG. 14.

FIG. 15 illustrates the housing case 20 of the electronic interactive table 2 of FIG. 14 in a schematic diagram, wherein the computing device 22 is disposed in the housing case 20.

Figure 16:
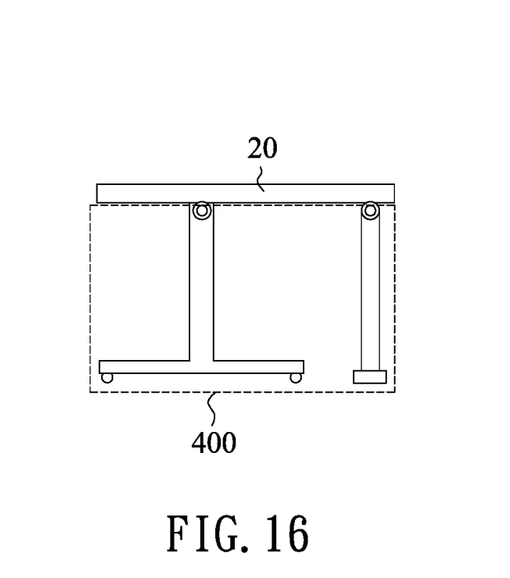
FIG. 16 is a schematic diagram illustrating another embodiment based on the electronic interactive table of FIG. 4.
Figure 17:
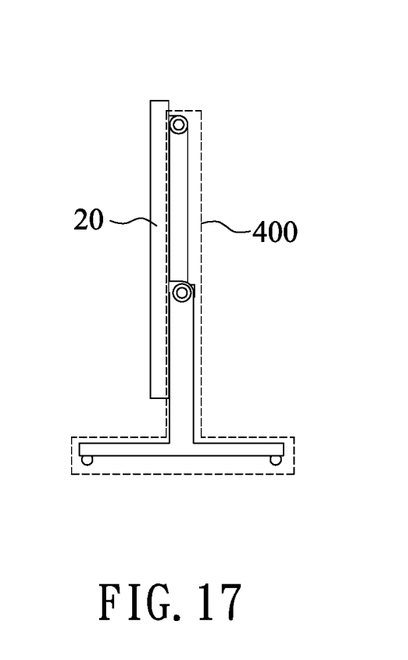
FIG. 17 is a schematic diagram illustrating another embodiment based on the electronic interactive table of FIG. 4.

In some embodiments, an electronic interactive table based on FIG. 4 may further include a support frame 400, is foldably connected to the housing case 20. FIG. 16 illustrates another embodiment based on the electronic interactive table of FIG. 4 in a schematic diagram, wherein the support frame 400 has a plurality of adjustable support feet. FIG. 17 is a schematic diagram illustrating another embodiment based on the electronic interactive table of FIG. 4, wherein the support frame 400 also has a plurality of adjustable support feet.

As shown in FIG. 14, FIG. 15 or FIG. 16, when the support frame 400 is in a first state, such as an open state, the support frame 400 enables the electronic interactive table to stand on the ground and the touch display area TD to be directed upward for user interaction. As shown in FIG. 17, when the support frame 400 is in a second state, such as a folded state, the support frame 400 enables the electronic interactive table 2 to stand on the ground and the touch display area TD to be directed horizontally for user interaction or image viewing. However, the implementation of the invention is not limited to the above examples. For example, In another embodiment, an electronic interactive table based on FIG. 4 may have a non-foldable support frame that is pivotally connected to the housing case so that the support frame and the housing case (or the body of the electronic interactive table) can be relatively rotatable so that the support frame can be in a first state or a second state, allowing the user to use the electronic interactive table.

Figure 18:
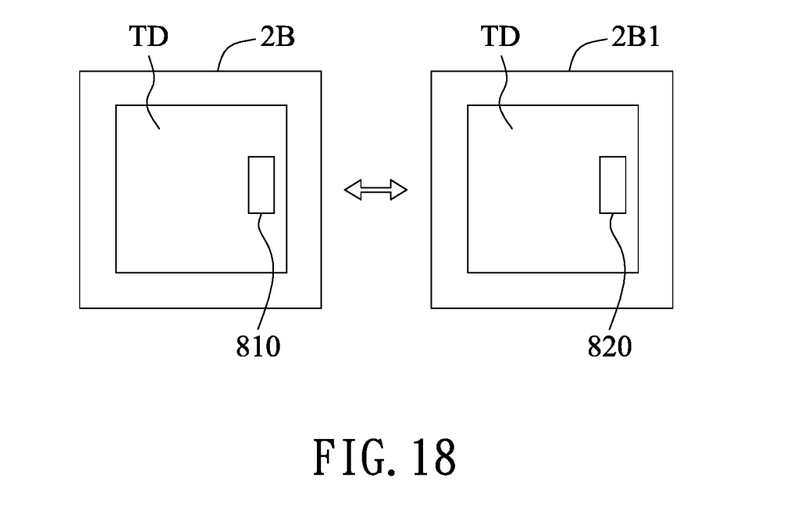
FIG. 18 is a schematic diagram illustrating an embodiment of communication between an electronic interactive table and another electronic interactive table, based on FIG. 4.

In some embodiments, a plurality of the electronic interactive tables based on FIG. 4 may be implemented to communicate with each other. Referring to FIG. 18, an embodiment of communication between an electronic interactive table 2B and another electronic interactive table 2B1 based on FIG. 4 is illustrated in a schematic diagram.

In some embodiments, the computing device 22 of the electronic interactive table 2B based on FIG. 4 is further utilized to communicate with the computing device 22 of the electronic interactive table 2B1 based on FIG. 4. The electronic interactive table 2B changes the user interface image 810 to be displayed by the touch display area TD, based on data for communication with the another electronic interactive table 2B1, so as to enable the electronic interactive table 2B to interact with the another electronic interactive table 2B1. Likewise, the another electronic interactive table 2B1 can change the user interface image 820 to be displayed by the touch display area TD, based on data for communication with the electronic interactive table 2B, so as to enable the electronic interactive table 2B to interact with the another electronic interactive table 2B1, such as giving an invitation to video games or chatting.

Figure 19:
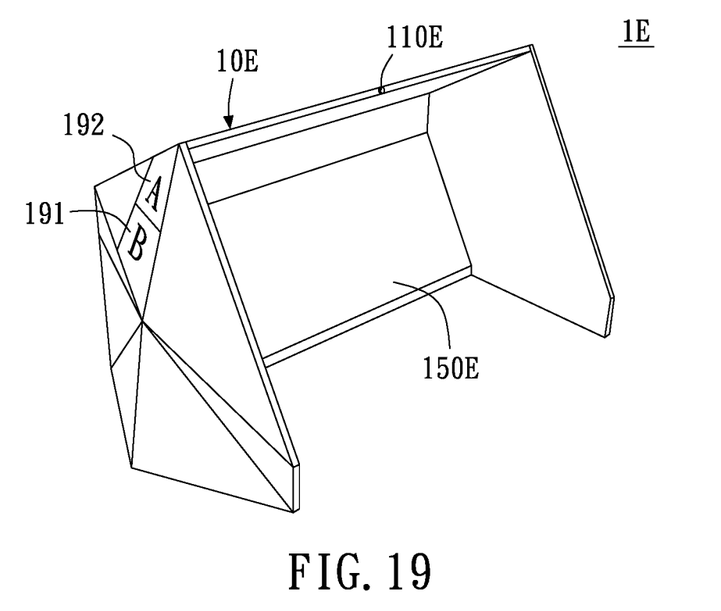
FIG. 19 is a schematic diagram illustrating an embodiment of the interactive table covering device.

In some embodiments, as shown in FIG. 19, an interactive table covering device 1E may be implemented to include a cover body 10E configured in a way such that a screen 150E for displaying an user interface is disposed in an inner wall of the cover body 10E with a non-right angle with respect to a plane that the interactive table covering device 1E is placed on (e.g., the touch display area TD of the electronic interactive table 2) in order to facilitate a better user experience for viewing. The screen 150E may be provided by a built-in display unit (e.g., the display unit 150, which may include an LCD, OLED or other panel). In addition, the interactive table covering device 1E may include one or more buttons 191, 192 (e.g., mechanical or touch-sensitive buttons) equipped on the cover body 10E to serve as a portion of the user interface provided by the interactive table covering device 1E, for example, to select a user function, or adjust or turn on or off the display. The interactive table covering device 1E may have its image capturing unit 110E disposed on an edge on the cover body 10E, as shown in FIG. 19. Further, the image capturing unit in any of the embodiments of the disclosure may be implemented to be disposed inside the cover body of the interactive table covering device and adjacent to an opening in the cover body so that image light may be received by the image capturing unit through the opening. In this manner, the image capturing unit 110 as shown in FIG. 1 may also be implemented.

Figure 20:
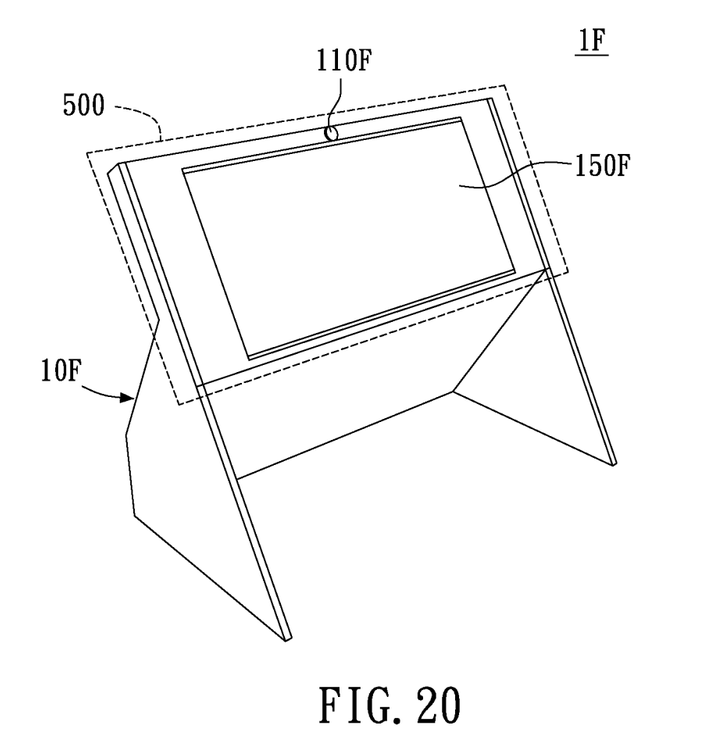
FIG. 20 is a schematic diagram illustrating another embodiment of the interactive table covering device.

In some embodiments, as shown in FIG. 20, an interactive table covering device 1F may be implemented to include a cover body 10F configured in a way such that a screen 150F for displaying an user interface is presented on an outer wall of the cover body 10F with a non-right angle with respect to a plane that the interactive table covering device 1F is placed on (e.g., the touch display area TD of the electronic interactive table 2) in order to facilitate a better user experience for viewing and usage convenience. The screen may be provided in various approaches. In an example, the cover body 10F is configured to provide the screen 150F by a built-in display unit (e.g., the display unit 150) of the interactive table covering device 1F and, optionally, to have its image capturing unit 110F disposed on an edge on the cover body 10F. In another example, the cover body 10F is configured to enable a user device, such as a smart mobile phone or tablet computer, to provide the screen 150F, wherein the cover body 10F may be implemented to have a support portion 500 for receiving or accommodating the user device so that the user device is able to be placed on the support portion 500. In this example, the interactive table covering device 1F may be configured to communicate with the user device in a wireless or wireless manner so as to facilitate interaction between the user device, the interactive table covering device 1F, and the electronic interactive table 2. In addition, the support portion 500 may be optionally implemented as a region for wireless charging, wherein charging circuitry is disposed inside the cover body 10F. The support portion 500 may be implemented with a plane, a concave region, a convex region, or any structure, where it is appropriate.

The interactive table covering device 1E or 1F may be implemented using any one or combination of the above embodiments where it is appropriate.

As disclosed above, the above various embodiments can be employed to implement the interactive table covering device and the electronic interactive table system having the interactive table covering device. The usage of the interactive table covering device can facilitate user operation efficiency and reduce the burden on user operations, so as to make the user obtain a convenient and smooth experience. In some embodiments, effective applications may be further extended.

In the description of this specification, the description of the terms "one embodiment," "some embodiments," "examples," "specific examples," or "some examples," and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

While the present disclosure has been described by means of specific embodiments, numerous modifications and variations could be made thereto by those skilled in the art without departing from the scope and spirit of the present disclosure set forth in the claims.

What is claimed is:

1. An interactive table covering device, for communicating with an electronic interactive table, wherein the interactive table covering device comprising:
   a cover body, having at least one covering surface and a shaded space defined by the at least one covering surface, the shaded space opening to outside;
   an image capturing unit, disposed on the cover body;
   a storage unit, disposed inside the cover body;
   a communication unit, disposed inside the cover body, for communicating with the electronic interactive table; and
   a processing unit, disposed inside the cover body and electrically coupled to the image capturing unit, the storage unit, and the communication unit, for controlling the image capturing unit, the storage unit, and the communication unit;
   wherein when the interactive table covering device is placed on a touch display area of the electronic interactive table, the shaded space opens to the touch display area and outside, and the interactive table covering device corresponds to a sub-area of the touch display area as a shaded area, the interactive table covering device is utilized for controlling, through the communication unit, the electronic interactive table to display a user interface image associated with a user in the shaded area.

2. The interactive table covering device according to claim 1, wherein the at least one covering surface includes a first covering surface, a second covering surface, and a third covering surface, wherein the second covering surface and the third covering surface are smaller than the first covering surface and respectively bend at two transversal sides of the first covering surface and extend, the first covering surface is a covering surface curved from bottom to top, the shaded space is partially surrounded by the first covering surface, the second covering surface, and the third covering surface.

3. The interactive table covering device according to claim 1, wherein the image capturing unit obtains facial image data of the user, the processing unit is utilized to perform user recognition based on the facial image data so as to generate identification data, the communication unit is utilized to transmit the identification data to the electronic interactive table, so as to enable the electronic interactive table to display the user interface image associated with the user in the shaded area, based on the identification data.

4. The interactive table covering device according to claim 1, wherein the image capturing unit obtains facial image data of the user, the processing unit controls the communication unit to transmit the facial image data to the electronic interactive table, so as to enable the electronic interactive table to display the user interface image associated with the user in the shaded area, based on the facial image data.

5. The interactive table covering device according to claim 1, wherein the interactive table covering device further includes at least one touch end disposed on a bottom surface, when the interactive table covering device is placed on the touch display area, the at least one touch end is utilized for making at least one touch in the touch display area, so as to enable the electronic interactive table accordingly to locate the interactive table covering device in the touch display area and thus determine contents to be displayed by the touch display area in the shaded area.

6. The interactive table covering device according to claim 1, wherein the interactive table covering device further includes:
   a display unit, disposed in the shaded space and electrically coupled to the processing unit;
   wherein the processing unit receives user interface image data transmitted from the electronic interactive table through the communication unit, and accordingly controls the display unit to display the user interface image, so as to interact with the electronic interactive table.

7. The interactive table covering device according to claim 6, wherein the display unit is a touch screen, for receiving touch input and accordingly interacting with the electronic interactive table.

8. The interactive table covering device according to claim 1, wherein the interactive table covering device further includes:
   a display unit, disposed in the shaded space and electrically coupled to the processing unit;
   wherein when the interactive table covering device is removed from, or is off, the touch display area, the processing unit is utilized to control the display unit, and receives user interface image data transmitted from the electronic interactive table through the communication unit, and accordingly controls the display unit to display the user interface image associated with the user, so as to interact with the electronic interactive table.

9. The interactive table covering device according to claim 8, wherein the display unit is a touch screen, for receiving touch input and accordingly interacting with the electronic interactive table.

10. The interactive table covering device according to claim 8, wherein the interactive table covering device further includes:
    a sound unit, electrically coupled to the processing unit, for sound producing and sound recording; when the interactive table covering device is removed from, or is off, the touch display area, the processing unit controls the sound unit, so as to interact with the electronic interactive table.

11. The interactive table covering device according to claim 8, wherein when the interactive table covering device is removed from, or is off, the touch display area, the interactive table covering device is utilized to control the electronic interactive table to change the user interface image, previously displayed in the shaded area before the interactive table covering device is removed from, or is off, the touch display area, into another user interface image.

12. The interactive table covering device according to claim 1, wherein the interactive table covering device is utilized to communicate with a terminal device by way of the communication unit and the electronic interactive table, wherein the image capturing unit obtains image data of the user beside the electronic interactive table, the processing unit outputs and transmits live image data based on the obtained image data to the terminal device through the communication unit and the electronic interactive table so that the electronic interactive table is capable of remotely interacting with the terminal device.

13. The interactive table covering device according to claim 1, wherein the user interface image includes an indication of a card for the user, a gaming token for the user, or a game instruction.

14. The interactive table covering device according to claim 1, further comprising a button, disposed on the cover body.

15. The interactive table covering device according to claim 1, wherein the cover body includes a support portion for receiving a user device.

16. An electronic interactive table system comprising:
an electronic interactive table including:
a touch screen, which provides a touch display area; and
a computing device, electrically coupled to the touch screen, for communication and for generating a user interface for interaction; and
an interactive table covering device including:
a cover body, having at least one covering surface and a shaded space defined by the at least one covering surface, the shaded space opening to outside;
an image capturing unit, disposed on the cover body;
a storage unit, disposed inside the cover body;
a communication unit, disposed inside the cover body, for communicating with the electronic interactive table; and
a processing unit, disposed inside the cover body and electrically coupled to the image capturing unit, the storage unit, and the communication unit, for controlling the image capturing unit, the storage unit, and the communication unit;
wherein when the interactive table covering device is placed on the touch display area of the electronic interactive table, the shaded space opens to the touch display area and outside, and the interactive table covering device corresponds to a sub-area of the touch display area as a shaded area, the interactive table covering device is utilized for controlling, through the communication unit, the electronic interactive table to display a user interface image associated with a user in the shaded area.

17. The electronic interactive table system according to claim 16, wherein the electronic interactive table further includes:
a housing case, surrounding lateral sides of the touch screen so that the touch display area is capable of standing upward, wherein the computing device is disposed inside the housing case;
an image capturing unit, disposed on the housing case; and
a sound unit, disposed on the housing case, wherein the image capturing unit and the sound unit are utilized for video interaction.

18. The electronic interactive table system according to claim 17, wherein the computing device is utilized to communicate with a terminal device, wherein the image capturing unit of the electronic interactive table obtains image data of the user beside the electronic interactive table, the computing device outputs and transmits live image data based on the obtained image data to the terminal device so that the electronic interactive table is capable of remotely interacting with the terminal device.

19. The electronic interactive table system according to claim 17, wherein the electronic interactive table further includes:
a support frame, connected to the housing case, wherein when the support frame is in a first state, the support frame enables the electronic interactive table to stand on the ground and the touch display area to be directed upward for user interaction; when the support frame is in a second state, the support frame enables the electronic interactive table to stand on the ground and the touch display area to be directed horizontally for user interaction or image viewing.

20. The electronic interactive table system according to claim 16, wherein the computing device is further utilized to communicate with another electronic interactive table, and change the user interface image to be displayed by the touch display area, based on data for communication with the another electronic interactive table, so as to enable the electronic interactive table to interact with the another electronic interactive table.

* * * * *